(12) United States Patent
Nethsinghe et al.

(10) Patent No.: US 8,980,373 B2
(45) Date of Patent: Mar. 17, 2015

(54) SUPPORTED ELASTOMERIC GLOVE WITH ENHANCED GRIPPING SURFACE AND A METHOD OF TRANSFERRING OF PATTERNS ONTO A DIPPED ELASTOMERIC GLOVE SURFACE

(75) Inventors: Lakshman Premal Nethsinghe, Colombo (LK); Rajapakshe Mudiyanselage Tilokraj Premarathna, Colombo (LK); Kariyawasam Ampegama Gamage Gamini Kularatne, Colombo (LK); Raja Nihal Kurunduwa Hewage, Colombo (LK)

(73) Assignee: Dipped Products PLC, Colombo (LK)

( * ) Notice: Subject to any disclaimer, the term of this patent is extended or adjusted under 35 U.S.C. 154(b) by 898 days.

(21) Appl. No.: 13/106,329

(22) Filed: May 12, 2011

(65) Prior Publication Data

US 2012/0288628 A1   Nov. 15, 2012

(51) Int. Cl.
*A41D 19/00* (2006.01)
*B29C 59/02* (2006.01)
*B29C 59/00* (2006.01)
*B29C 41/14* (2006.01)
*B29D 99/00* (2010.01)
*D06N 3/10* (2006.01)
*A41D 19/015* (2006.01)

(52) U.S. Cl.
CPC ............ *B29D 99/0067* (2013.01); *D06N 3/106* (2013.01); *A41D 19/01547* (2013.01); *A41D 19/0055* (2013.01); *D06N 2209/106* (2013.01); *D06N 2211/103* (2013.01)
USPC ........... 427/277; 427/258; 427/261; 427/264; 427/270; 427/271; 2/159; 2/161.6; 2/161.7; 2/168; 2/169

(58) Field of Classification Search
None
See application file for complete search history.

(56) References Cited

U.S. PATENT DOCUMENTS

| 4,218,779 A | 8/1980 | Hart et al. |
| 4,283,244 A | 8/1981 | Hashmi |
| 5,098,755 A | 3/1992 | Tanquary et al. |
| 2006/0041991 A1 | 3/2006 | Sim |

FOREIGN PATENT DOCUMENTS

| WO | 00/19847 A1 | 4/2000 |
| WO | 2006/053140 A2 | 5/2006 |

OTHER PUBLICATIONS

International Search Report: PCT/IB2009/051284; mailed Aug. 18, 2009.

*Primary Examiner* — Michael Cleveland
*Assistant Examiner* — Lisha Jiang
(74) *Attorney, Agent, or Firm* — Ladas & Parry LLP

(57) ABSTRACT

A semi cured supported elastomeric glove with enhanced gripping surfaces achieved by the method of transferring of patterns by compression molding, including a plurality of concave indentations of any pattern and molded into the gripping surfaces of the semi cured glove.

9 Claims, 6 Drawing Sheets

– Honey comb

– Circle

– Rectangle

– Oval

– Star

– Diamond

– lettering

– Animal Face

– Happy Face

– Studded Square

SUPPORTED ELASTOMERIC GLOVE WITH ENHANCED GRIPPING SURFACE AND A METHOD OF TRANSFERRING OF PATTERNS ONTO A DIPPED ELASTOMERIC GLOVE SURFACE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION (1) Field of the Invention

The disclosure relates to introducing a pattern onto the surface of elastomeric fabric supported gloves made from conventional sulphur vulcanised formulations in the wet gel state using an engraved moulding plate, and a flat former using compression moulding technique. The pattern so produced is permanent, uniform throughout the whole of the patterned area, and may be of any design—single pattern or multi pattern. The pattern so formed also provides the glove with enhanced grip as a consequence of the uniformity of the pattern.

(2) Description of Related Art

Conventional methodology for making patterns on supported gloves rely on the following techniques: screen printing elastomer-pattern is provided from pattern on screen; use of a solvent/solvent mixture to provide a pattern to the dipped glove during the production process; laminating with the aid of an adhesive pre-embossed piece of elastomer film onto a supported glove; laminating a liner onto a glove which has been previously dipped onto a former containing a patterned surface using an adhesive; and/or laminating a glove onto a liner dressed onto a former using an adhesive WO 2000/019847 describes a method of producing grip-enhanced gloves by way of a mould that has convex patterns on it so that when a glove is manufactured using a dipped process, the glove contains concave indentations that give a gripping effect. Practically, these gripping areas are considerably large, work well on flat surfaces only and apply only to an un-supported glove.

WO 2006/053140 describes a method of producing grip-enhanced gloves by using negatively and positively patterned moulds. In this method, gripping elements could be made very small, but due to the fact that two plates—negative and positive—are used this method cannot be used to transfer patterns to supported (using liners made of textile, aramides, etc) gloves.

U.S. Pat. No. 5,098,755 describes a means of embossing uniform patterns onto films of thermoplastic elastomers. It also refers to applications on condoms and certain other items such as surgical gloves made from thermoplastic elastomers. Thermoplastic elastomers are a special type of material composed at a molecular sub micron level of hard and soft domains. They are different from conventional elastomers. The strength of the thermoplastic material is present by virtue of the hard and soft domains. Therefore Thermoplastic materials can easily be reshaped heated (embossed) and cooled, and the embossing effect will prevail until it is heated above the softening point of the hard blocks.

U.S. Pat. No. 4,283,244 refers to making fabric lined elastomeric articles, wherein the pattern is on the outside. This process involves a methodology wherein a composite liner is dressed onto an uncured latex glove prior to oven cure and stripping the composite liner from the glove. After stripping, the glove is turned inside out and the pattern is on the outer surface.

Normally in supported glove manufacturing involving latex systems based on natural rubber latex, nitrile latex, neoprene latex, and SBR latex, embossing the pattern onto a glove during the wet gel state of the glove manufacturing operation has not been performed. Patterns are introduced to enhance grip, and in conventional technology the pattern is made by using the methodology identified in (b) above, in which the pattern is introduced to the glove by dipping into a solvent or solvent mixture prior to vulcanisation whilst still in the wet gel state. The pattern so formed is often wavy and non-uniform (i.e. the intensity of pattern varies along patterned area).

Therefore there exists a need to emboss different types of patterns and have a uniform pattern distribution in supported glove manufacturing after dipping and prior to vulcanisation. The present application provides a solution for this need.

BRIEF SUMMARY OF THE INVENTION

In the present disclosure, a pattern is introduced to the elastomeric component of the supported glove whilst in the wet gel state prior to vulcanisation. The pattern formed by the present methodology is uniform throughout the whole of the patterned area. Furthermore, the pattern can be of any design and variations being limited to what can be embossed on to the metal plate employed to impart the pattern on to the elastomer. Employment of such a methodology provides an easy method that transfers patterns consistently onto an elastomeric supported glove surface to render the glove more aesthetically pleasing and/or incorporate other desirable patterns such as company logos or brand names and/or give the glove a higher degree of flexibility and/or give the glove a better gripping ability, also to facilitate better wet grip.

The present process applies to conventional latex elastomers, which require chemicals to be added to the elastomer during the manufacturing process (e.g. vulcanising ingredients mixed into latex) in which the strength is achieved by a vulcanising process and application of heat in an oven. The product so formed is a thermoset. In our process the embossing is performed prior to vulcanisation in the wet gel state stage of the operation. Furthermore, once vulcanised the embossed effect is permanent. The latex we are working with is a conventional rubber (natural rubber, nitrile rubber, neoprene rubber), which requires vulcanising ingredients to impart strength to the elastomer.

The present disclosure provides a supported elastomeric glove with an enhanced gripping surface and a method of transfer of patterns onto a glove outer surface using a preformed moulding plate/mould other than the glove fabricating mould itself without the use of a solvent process in the wet gel state prior to vulcanisation of the elastomer. It applies to gloves made by a dipping process using latex as the elastomer.

Furthermore the pattern transfer process may also be applied to rubbers dissolved in solvents prior to the vulcanisation operation. The pattern may take any shape and any such pattern can be transferred onto the glove using the compression moulding method. The pattern shall be used to enhance the aesthetic appearance of the glove or the functionality of the glove in terms of better grip and/or higher flexibility. The pattern may or may not be uniform throughout the surface. The pattern can either cover the outer surface completely or only part/parts of it. The pattern can also have company logos, brand names or other shapes incorporated into it giving variation in the pattern within a glove. The glove may be made of any natural or synthetic elastomer or a blend thereof. The fabric liner may be made of any knitting yarn or made by cutting and sewing.

The process disclosed in the present application eliminates the need to have negative and positive plates as mentioned in the prior art. This process makes it much easier to have wide variety of patterns because only one plate needs to be cut where a matching negative plate is not required. This process does not alter the dimensions of the glove; compression moulding process removes entrapped water, which is also advantageous when energy required for curing is considered. The methods described in prior art cannot be used to make a pattern on a supported glove.

DETAILED DESCRIPTION OF THE INVENTION

Figure 1:
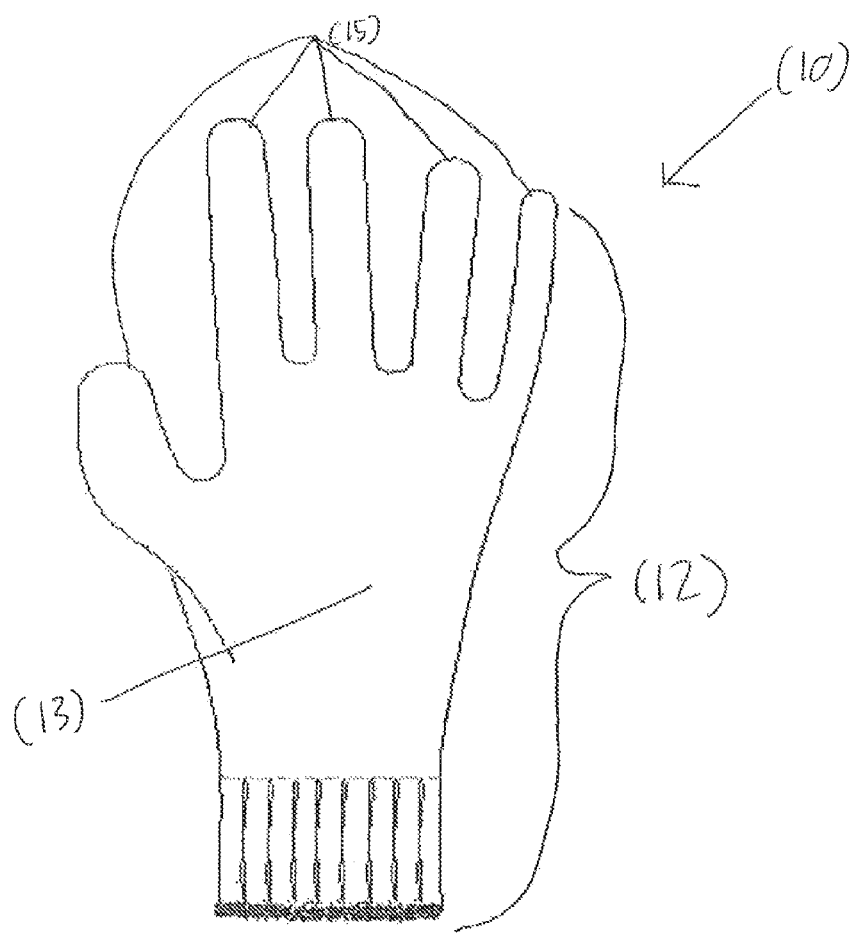
FIG. 1 is a plan view of a glove generally shown prior to pattern being transferred using the present process of the application.
Figure 2:
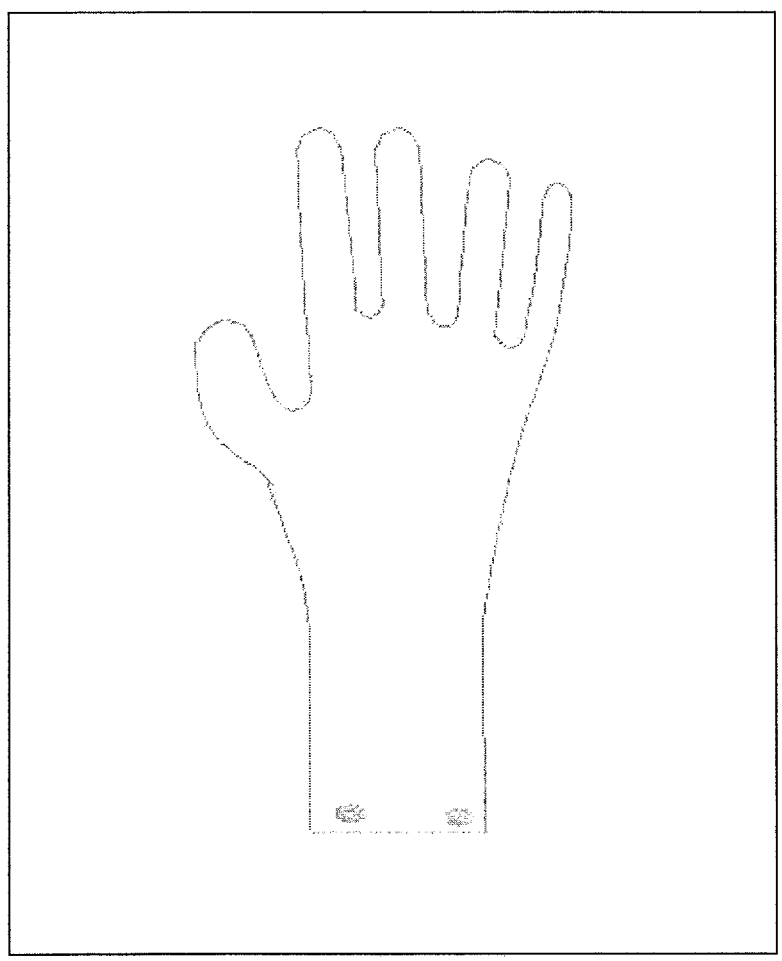
FIG. 2 shows a flat former used in compression moulding.

Referring to FIG. 1, a fabric supported elastomeric glove (10) is generally shown. The present disclosure relates to a method of transferring patterns (see FIG. 6) onto a fabric supported elastomeric glove surface (12) rendering the glove (10) aesthetically pleasing and having enhanced gripping properties compared to a supported glove made with a natural or synthetic fibre based liner (not shown) coated with Natural Rubber or Synthetic elastomer or a blend thereof, consisting of a permanent pattern impression (see FIG. 6) made by a non chemical process on the palm (13) and fingers (15) to improve grip and other properties related to the usage of the glove (10). A drying process of the glove (10) is interrupted at a stage where the gel strength of the glove film (not shown) is such that it could withstand compression force without cracking up, or disintegrating. The glove (10) is then removed from a dipping former (not shown) and dressed on to a flat former (14), as shown in FIGS. 2 and 3.

Figure 3:
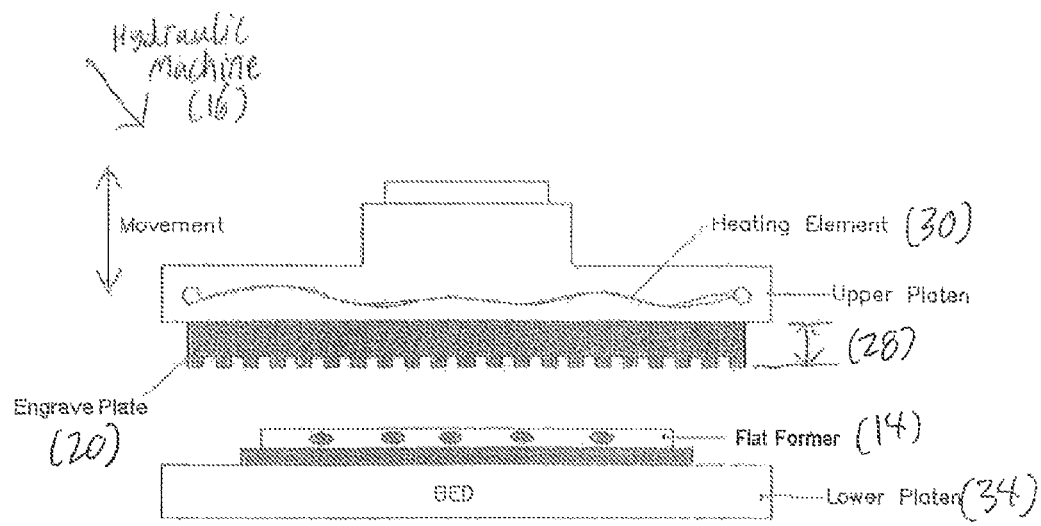
FIG. 3 shows the process of moulding a pattern onto the latex dipped supported glove using compression moulding.
Figure 6:
FIG. 6 shows a non-exhaustive list of example patterns that may be a transferred to an elastomeric glove by the process described in the present application.
Figure 6:
Figure 6:
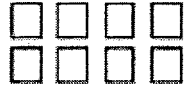
Figure 6:
Figure 6:
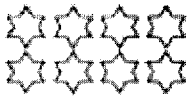
Figure 6:
Figure 6:
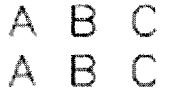
Figure 6:
Figure 6:
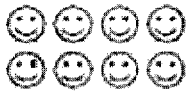
Figure 6:
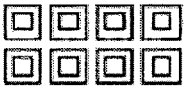

The surface (12) of the glove (10) is then subjected to compression force by a hydraulic machine (16), shown generally in FIG. 3, to leave a desired imprint (See FIG. 6) on the elastomeric surface (12), which will become a special grip pattern, such as one selected from FIG. 6.

Figure 4:
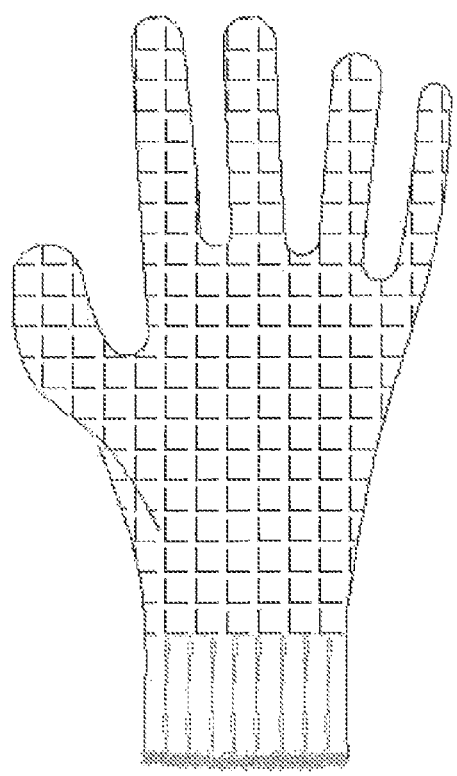
FIG. 4 is a plan view of a glove manufactured using the present process of the application.
Figure 4A:
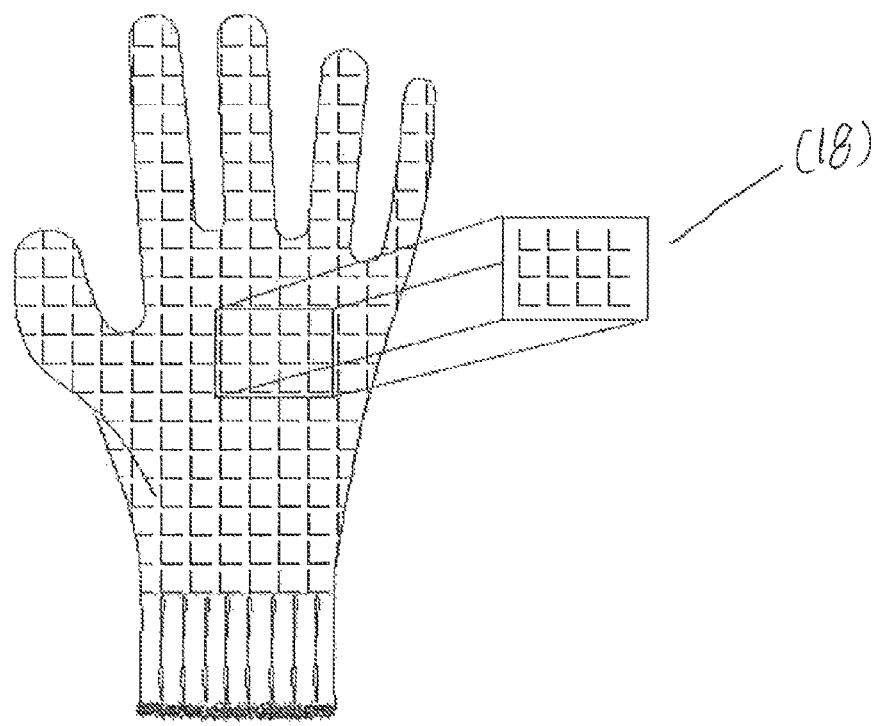
FIG. 4a shows an enlarged view of a square impression on the plan view of the glove.

The special grip pattern on the elastomer can have any design but a series of square depressions (18), as shown in FIG. 4a, which will come into contact with a handled object (not shown), is recommended for better grip.

The introduction of the grip pattern by pressing and moulding the elastomer glove (10) using a preformed engraved moulding plate (20) makes it possible for the formation of a series of depressions (18), which are very uniform in arrangement and dimensions on the elastomer glove (10).

There is provided according to one embodiment of the present disclosure a glove (10) with a polycotton fabric lining (not shown) and a natural rubber partial coating (not shown) with a preformed moulded pattern (See FIG. 6).

A latex based compound for an elastomer film is made using accelerators, activators, sulphur which are mixed using high speed stirrers, ball mills, etc. A textile liner is made by special purpose glove knitting machine of gauge 10 (or 13, 15, 18 or using Whole Garment Technology™ (WG)) with poly cotton 65:35 yarn. This liner can be replaced with a cut and sewn liner if it is desired. The gloves may be made of any blends of material or any knitted/woven material derived from cotton, nylon, polyester, polyester cotton, wool, para-aramid synthetic fiber, thermoplastic polyethylene, leather, or other engineering yarns. Commonly the latex includes natural rubber latex, nitrile latex/dispersions, neoprene latex, either by themselves or in combination with each other as blends. Other less common latex types based on other elastomers where chemicals are added to vulcanise the elastomer (e.g. Styrene butadiene rubber, silicone rubber, cis poly isoprene, butyl rubber, gunk rubber, etc.) may also be used to make the gloves.

The liners are dressed on to a mould. The mould referred to here consists of five fingers, palm and section of arm, where the hand is shaped to suit the dipping operation, and is made of Aluminum, Ceramic, or with heat resistant polymer resin. Then the dressed liner is dipped in elastomer to obtain a precise coating of elastomer using special purpose dipping machine or a robotic arm.

The elastomer coated liner is then dried and dipped in a special solvent free compound to increase the gel strength of the elastomer coating for the next process to take place.

Figure 5:
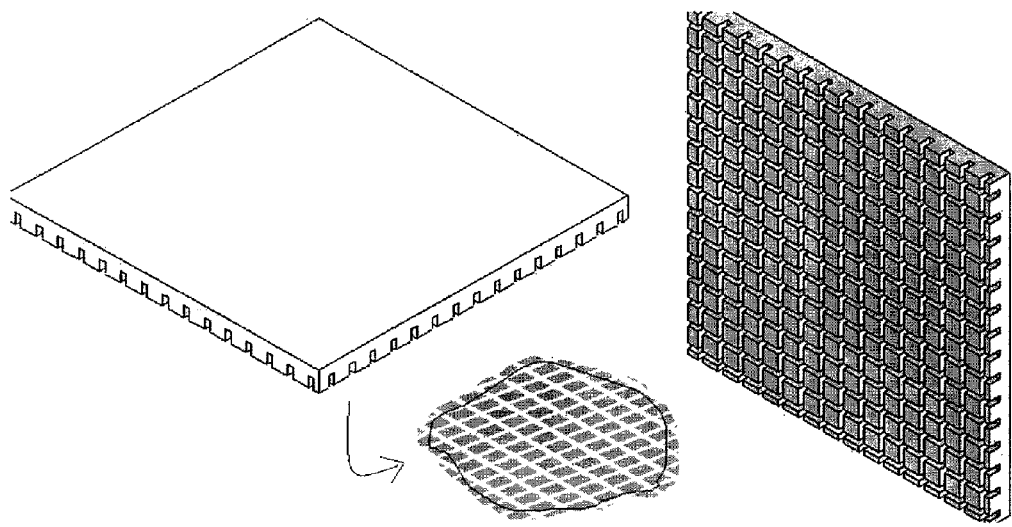
FIG. 5 shows an engraved plate used in compression moulding.

A pre designed pattern (See FIG. 6) is engraved on to a engraved plate (20) for formation of a grip pattern (See FIG. 6). A engraved plate (20) is cut using a programmable robot (not shown) programmed on three axis to cut a precise pattern (see FIG. 6), having specific length, breadth and depth as shown in FIG. 5. The robot is used to get a precise finish. A engraved plate can be cut also using other conventional tools and techniques, or by a chemical engraving process.

The pattern is cut on the engraved plate (20) which has sufficient thickness (28) for cutting and strength to prevent deformation during heating and compression. If a logo (not shown) is intended for the glove (10) then in fabrication of the engraved plate, the logo is embedded at the base of the engraved plate. The location of the logo is carefully selected so that the logo appears at the base of the palm (13) or elsewhere; which does not hinder the function of the elastomer surface (12) in gripping an object. Alternatively chemical engraving of the metal plate (20) is also possible. The engraved plate (20) is fixed to preferably a hydraulically operated pressing machine (16) designed to deliver a specific predetermined force/pressure. The engraved plate could be heated by suitable means (30) to achieve a temperature of around 50-100° C. before pressing is done.

The partially dried supported glove (10) is removed whilst still in a wet gel state and dressed on to a special moulding plate called a flat former (14). The flat former (14) is made of a metal plate with sufficient thickness, has five fingers, palm, and section of arm, and called a flat former due to its shape. The glove (10) is dressed onto it carefully. The dressed glove (10) is then placed on the lower platen (34) of the hydraulic press machine (16) and compressed under the engraved plate (20) to make an impression on the elastomer surface (12). The pressure is controlled so that the elastomer (12) is not damaged. In engraving the pattern (see FIG. 6) onto the engraved plate (20), care has to be taken to not to have edges too sharp which will cut in to the elastomer surface (12) of the glove (10) and ruin its performance. This is achieved in designing phase of pattern. The glove (10) with the moulded pattern (see FIG. 6) is then removed from the flat former (14), washed, dressed onto another former (not shown) and cured completely in a curing oven having temperature controls and moisture management technology.

In another embodiment, instead of working with latex, the flat former (14) pre-dressed with a liner is dipped into a solution (not shown) of an elastomer+vulcanising ingredients. After full or partial drying of the solvent, the supported glove (10) is embossed with a pattern as described above prior to curing whilst still in the wet gel state or fully uncured state prior to full vulcanisation in an oven. In such an instance prior to making the solution of the elastomer, the vulcanising agents and other formulation ingredients are either mixed into the solid elastomer in a mill (2-roll mill, Bambury, Busco-Kneader, or other type of mill used for milling ingredients into solid rubber), a technique well known to those working in the field of solid rubber mixing or they are added to a solution of the elastomer in the solvent as solutions/dispersions in suitable miscible solvents.

While the present description relates to the manufacture of the said glove (10) it will be understood that the present disclosure can easily be applied to the manufacture of any other type of fully elastomeric glove or glove with a fabric liner and a partial or full elastomeric coating by those of ordinary skill in the art of glove manufacture.

The invention claimed is:

1. A method of transferring one or more patterns onto a surface of a fabric-supported elastomeric glove, the method comprising the steps of:
   forming the fabric-supported elastomeric glove by dipping a fabric support into an elastomeric coating material to form an elastomeric coating on the fabric support;
   providing a flat former and a hydraulic press machine, the hydraulic press machine being comprised of a lower platen and an attached engraved plate having a predetermined mould;
   while the elastomeric coating is in an uncured state, dressing the fabric-supported elastomeric glove onto the flat former and placing the dressed glove on the lower platen of the hydraulic press machine; and
   moulding the elastomeric coating of the dressed glove with the engraved plate by applying pressure to the engraved plate, wherein the moulding causes a transfer of one or more patterns onto the surface of the fabric-supported elastomeric glove, the transferred one or more patterns being uniformly distributed on the elastomeric coating of the fabric-supported elastomeric glove.

2. The method as set forth in claim 1, wherein the engraved plate having the predetermined mould is formed by patterning a metal plate by one of a cutting process using a robot programmed on three axis, a die cutting method, a chemical engraving process that engraves a predetermined pattern, and a moulding process using a shaped and/or contoured plate.

3. The method as set forth in claim 1, further comprising the step of partially drying the elastomeric coating before the steps of dressing the fabric-supported elastomeric glove onto the flat former and of placing the dressed glove on the lower platen of the hydraulic press machine, wherein the hydraulic press machine is further comprised of a top platen to which the engraved plate having the predetermined mould is attached, the top platen being comprised of a mould heating facility that is used to provide heat to the top platen.

4. The method as set forth in claim 1, wherein the moulding step is a compression moulding step, during which the engraved plate is heated.

5. The method as set forth in claim 1, wherein the fabric support is made of a knitted and/or woven material that is derived from at least one of cotton, nylon, polyester, polyester cotton, wool, para-aramid synthetic fiber, thermoplastic polyethylene, leather, and other engineering yarns.

6. The method as set forth in claim 1, wherein the fabric support is dipped into the elastomeric coating material using a dipping machine, wherein the elastomeric coating material is comprised of an elastomeric component selected from the group consisting of natural rubber latex, acrylonitrile, butadiene, and combinations thereof and of at least one vulcanizing agent selected from the group consisting of sulfur, an accelerator, and an activator.

7. The method as set forth in claim 1, wherein the elastomeric coating material is comprised of solid rubber that is masticated with at least one vulcanizing agent selected from the group consisting of sulfur, an accelerator, and an activator and is dissolved in solvent.

8. The method as set forth in claim 1, wherein the uncured state of the elastomeric coating is achieved by, after dipping into the elastomeric coating material, drying the elastomeric coating of the fabric-supported elastomeric glove and subsequently dipping the fabric-supported elastomeric glove in a solvent-free latex compound.

9. The method as set forth in claim 1, wherein the uncured state of the elastomeric coating is achieved by applying a protective layer over the elastomer before the moulding step takes place.

* * * * *